United States Patent [19]

Bolze

[11] Patent Number: 5,373,386
[45] Date of Patent: Dec. 13, 1994

[54] TRANSMISSION/RECEPTION CIRCUIT IN A PASSIVE OPTICAL TELECOMMUNICATION SYSTEM

[75] Inventor: Thomas Bolze, Munich, Germany

[73] Assignee: Siemens Aktiengesellschaft, Munich, Germany

[21] Appl. No.: 191,478

[22] Filed: Feb. 4, 1994

[30] Foreign Application Priority Data

Mar. 19, 1993 [EP] European Pat. Off. ......... 93104559.5

[51] Int. Cl.$^5$ .......................................... H04B 10/00
[52] U.S. Cl. .................................. 319/167; 359/125; 359/140
[58] Field of Search ............... 359/118, 125, 137, 140, 359/152, 157, 164, 167, 113–114; 385/24; 370/95.2, 95.3

[56] References Cited

U.S. PATENT DOCUMENTS

| 4,726,010 | 2/1988 | Ali et al. .............................. 359/125 |
| 5,119,223 | 6/1992 | Fanzer et al. ......................... 359/135 |

FOREIGN PATENT DOCUMENTS

| 0032992 | 8/1981 | European Pat. Off. . |
| 0171080 | 2/1986 | European Pat. Off. . |
| 4125075 | 3/1992 | Germany . |

OTHER PUBLICATIONS

Patent Abstracts of Japan, vol. 8, No. 8 (E-221) [1445], Jan. 13, 1984 (Application 57-55056).
Patent Abstracts of Japan, vol. 8, No. 4 (E-220) [1441], Jan. 19, 1984 (Application 57-54253).
Patent Abstracts of Japan, vol. 8, No. 250 (E-279) [1687], Nov. 16, 1984 (Application 58-2257).
Patent Abstracts of Japan, Application No. 58-14078, Aug. 1984.
"Passive Fibre Local Loop for Telephony with Broadband Upgrade," Oakley et al., ISSLS-88 Conference Papers, pp. 9.4.1–9.4.5.
"The Provision of Telephony Over Passive Optical Networks," Hoppitt et al., British Telecom Technological Journal, vol. 17, No. 2, (1989) pp. 100–113.

Primary Examiner—Richard E. Chilcot, Jr.
Assistant Examiner—Kinfe-Michael Negash
Attorney, Agent, or Firm—Hill, Steadman & Simpson

[57] ABSTRACT

In a passive optical telecommunication system wherein a plurality of decentralized stations are respectively connected via their own respective light waveguide subscriber line to an optical brancher that is connected, in turn, directly or via at least one further optical brancher to a common light waveguide terminal of the center station via a light waveguide bus, the decentralized station and the centralized station each transmitting and receiving optical digital signals in common-frequency operation, a transmission/reception circuit at each decentralized station is provided to avoid a degradation of the reception sensitivity of the central station corresponding to the bit pattern of its transmitted signal. This transmission/reception circuit includes a reception signal inverter connected between the output of the opto-electrical transducer and the input of the electro-optical transducer, and an optical delay line whose delay time is matched to the operating time of the electrical reception signal invertor is inserted between the output of the electro-optical transducer and the light waveguide subscriber line. The transmission/reception circuit maintains the sum of the inverted reception signal component, and the part of the received signal, which is unavoidably reflected, at a constant level.

4 Claims, 1 Drawing Sheet

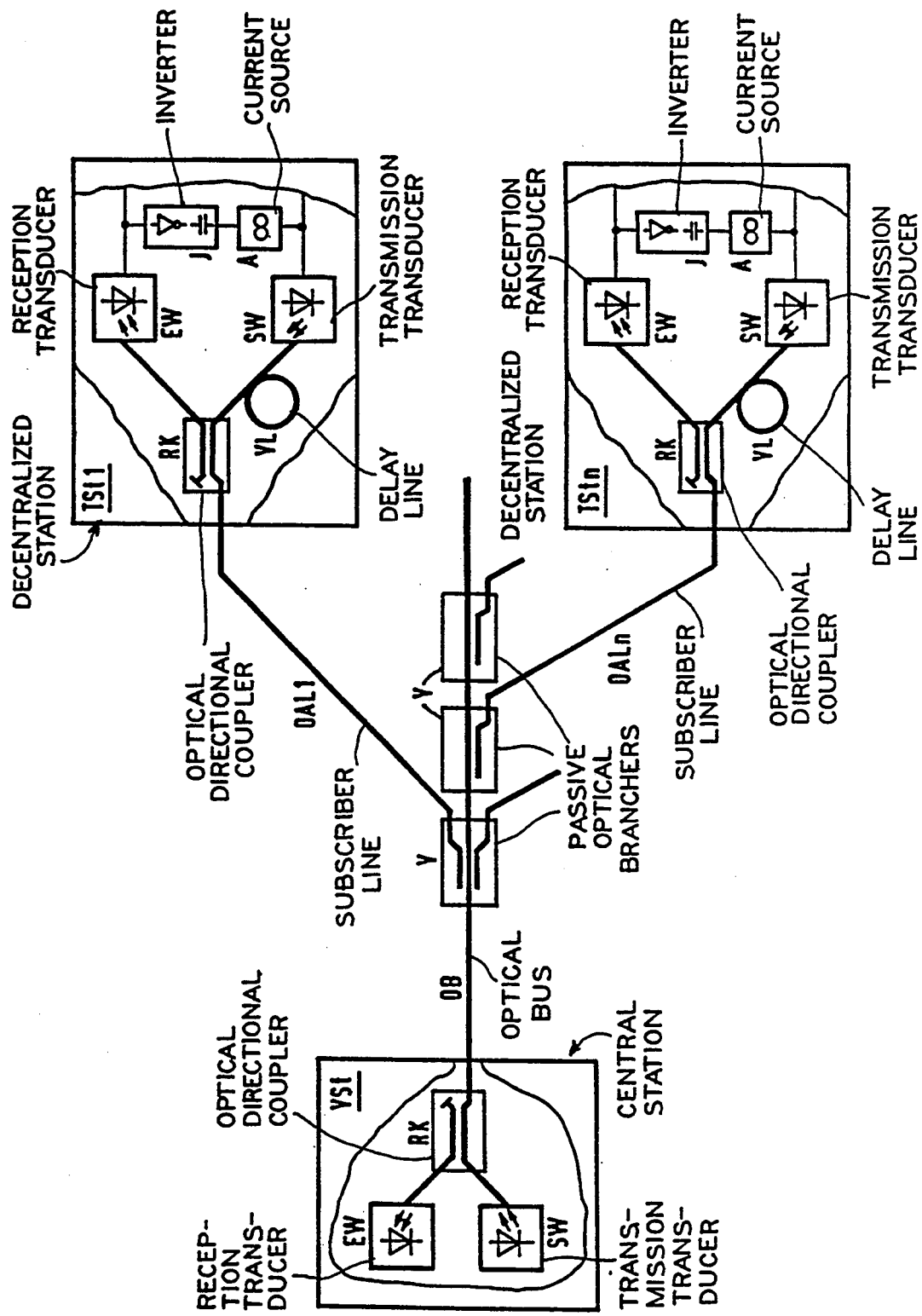

TRANSMISSION/RECEPTION CIRCUIT IN A PASSIVE OPTICAL TELECOMMUNICATION SYSTEM

BACKGROUND OF THE INVENTION

1. Field of the Invention

The present invention is directed to a transmission/reception circuit in a passive optical telecommunication system of the type having a central station in communication with a plurality of subscriber stations via respective optical waveguides.

2. Description of the Prior Art

Recent developments in telecommunications technology have lead to passive optical telecommunication systems wherein a plurality of decentralized stations (subscriber locations, or so-called distant units respectively combining a plurality of subscriber locations) are respectively connected via their own light waveguide subscriber line to an optical brancher. The optical brancher is connected directly or via at least one further optical brancher to a common light waveguide terminal of a central station—particularly an exchange—via a light waveguide bus. Such systems are described in European Application 0 171 080; "Passive Fiber Local Loop for Telephone with Broadband Upgrade," Oakley et al., ISSLS' 88, Conf. Papers pp. 9.4.1–9.4.5; and "The Provision of Telephony over Passive Optical networks," Hoppitt et al., BR Telecom Technol. J. Vol. 17 (1989) pp 100–113).

In such a passive optical telecommunication system, when the electro-optical transducers of the central equipment (exchange) and of the decentralized equipment (subscriber locations or distant units) preferably established by laser diodes transmit optical digital signals in the baseband with the same wavelength, i.e., in common-wavelength operation, the optical signals emitted by each location in such a telecommunication system can have an effect at that location's own receiver preferably established by a PIN-diode) due to reflections in the optical fiber network (optical cross talk), and thus can noticeably reduce the reception sensitivity thereof. Particularly critical is the approximately 1 through 10% reflectivity of laser diodes conventionally provided in decentralized equipment as electro-optical transducers. This is because measures for reducing reflection at laser diodes lead to a poorer coupling of the laser to the optical fiber, and thus to a lower optical power in the optical fiber, but parts of the light emitted by the central station are simultaneously reflected proceeding from all decentralized equipment to the opto-electrical transducer of the central station.

One can attempt to compensate for this problem by reducing the number of decentralized stations (subscriber stations (::lr distant units) per light waveguide terminal of the central station (exchange), and thus the demands made of the reception sensitivity of the central equipment are correspondingly reduced. This, however, means an increase in the number of light waveguide terminals in the central station and thus makes the entire system substantially more expensive, as would likewise the theoretically possible employment of optical isolators.

SUMMARY OF THE INVENTION

An object of the present invention is to provide a solution to the problem of reflection at decentralized laser diodes outlined above without significantly increasing the cost and/or complexity of the system.

The invention is directed to a transmission/reception circuit, preferably for use in a decentralized station in a passive optical telecommunication system wherein a plurality of decentralized station, particularly subscriber locations or distant units combining a plurality of subscriber locations, are respectively connected via their own light waveguide subscriber line to an optical brancher, that is in turn connected directly or via at least one further optical brantcher to a common light waveguide terminal of the central station, particularly an exchange, via a light waveguide bus. The decentralized station and the central station each transmit and receive optical digital signals in common wavelength operation. The transmission/reception circuit, in accordance with the principles of the present invention, has an opto-electrical reception transducer with an output connected to the input of an electro-optical transmission transducer via an electrical reception signal inverter, and further has an optical delay line having a delay time matched to the operating time (i.e., the time required for the inversion) of the electrical reception signal inverter. The delay line is inserted between the output of the electro-optical transmission transducer and the light waveguide subscriber line or an optical directional coupler that connects the subscriber line to the input of the opto-electrical reception transducer and the output of the electro-optical transmission transducer.

The invention makes use of the fact that the reception sensitivity of an optoelectrical transducer is especially degraded given a fluctuating intensity of the received light whereas a constant light level given an appropriate receiver design, has only a slight influence on the reception sensitivity. The invention produces the advantage of each transmitting location avoiding an overdrive of its own opto-electrical transducer produced by reflected transmission light signal parts in the bit pattern of the transmission signal (particularly at the central station) and of avoiding a degradation of the reception sensitivity for subsequent reception light signals that is associated therewith, and which correspond to the bit pattern of the transmission signal.

DESCRIPTION OF THE DRAWINGS

Further characteristics of the invention may be seen from the following description with reference to the drawing wherein a bi-directional light waveguide telecommunication system having a plurality of transmission/reception circuits of the invention is schematically shown.

DESCRIPTION OF THE PREFERRED EMBODIMENTS

In the bi-directional light waveguide telecommunication system outlined in the drawing, a passive (preferably monomode) light waveguide bus network extends between a central telecommunication station VSt which, for example, can be an exchange - and a plurality of decentralized telecommunication stations TStl ..... TStn. Such decentralized telecommunication stations can be subscriber locations, or so-called distant units which respectively combine a plurality of subscriber locations. Each station (central and decentralized) includes interface equipment provided with an electro-optical transmission transducer SW and an opto-electrical reception transducer EW which, possibly with the assistance of a multiplexer or demultiplexer ! (not shown in detail in the drawing) lying at the electrical side of the transmission or reception transducer, are capable of combining or splitting up to 32 ISDN-B channels.

In this light waveguide telecommunication system, the decentralized stations TSt are connected by a single-fiber light waveguide bus OB to a common light waveguide multiplex terminal of the central telecommunication station VSt. The light waveguide subscriber lines OAL1 ..... OALn belonging to the individual decentralized stations TSt1 ,...,TStn may be assumed to be connected to the appropriate light waveguide bus OB via passive optical branchers V accommodated, for example, in cable brancher housings. This connection can be made directly or via further such branchers. Tandem mixers or optical directional couplers, for example, can be employed as optical branchers. As indicated in the drawing, it is also possible - as is known, for example, from European Application 0 171 080 —to provide common optical branchers shared by a plurality of light waveguide subscriber lines (OAL).

In the telecommunication system outlined in the drawing, the individual telecommunication stations TStl ..... TStn and VSt are each provided with an opto-electrical reception transducer EW having a PIN diode and with an electro-optical transmission transducer SW having a laser diode. For decoupling electro-optical transmission transducers SW and opto-electrical reception transducers EW and for separating directions as well, an optical directional coupler (2×2 coupler) RK is inserted between the light waveguide subscriber line OAL (or at the central station, the bus OB) and both the opto-electrical reception transducer EW and electro-optical transmission transducer SW for that station. The telecommunication stations TStl ,...TStn and VSt transmit and receive optical digital signals in common-frequency operation.

In order to then prevent parts of digital optical signals, transmitted (in a bit pattern) by the central station VSt and reflected (in a proportionally reduced amplitude bit pattern) by the laser diodes of the electro-optical transducers SW contained in the decentralized stations TStl .... TStn, degrading the sensitivity of the opto-electrical transducer EW of the central station VSt, the decentralized telecommunication stations TSt1 .... TStn are each provided with transmission/reception circuits of the invention. As the drawing shows, the output of the opto-electrical transducer EW at each station is connected to the input of the electro-optical transducer SW at that station via an electrical reception signal invertor J. Also, an optical delay line VL whose delay time is matched to the operating time of the electrical reception signal invertor J is inserted between the output of the electro-optical transducer SW and the optical directional coupler connecting that output to the light waveguide subscriber line OAL - or connecting the latter to the input of the opto-electrical transducer EW. An approximately 10 through 100 cm long optical fiber is thereby required for a delay time of approximately 0.5 through 5 ns.

The bi-directional light waveguide telecommunication system outlined in the drawing then basically operates in the following way. When an optical signal component exhibiting maximum optical power (i.e., a "1") is transmitted by the central telecommunication station VSt, this proceeds via the light waveguide bus OB and the passive optical branchers V to the individual decentralized telecommunication stations TSt1 ..... TStn, and proceeds at each station via the respective optional directional coupler RK to the reception transducer EW and to the transmission transducer SW. A part of the optical power is unavoidably reflected at the laser diode of the transmission transducer SW. The received electrical signal component (i.e., a "1") appearing at the output of the reception transducer EW also drives the electrical reception signal invertor J so that a low signal component (i.e., a "0") appears at the output thereof, this low signal component in turn proceeds to the input of the transmission transducer SW, but it effects no additional modulation of the laser diode at the transducer SW.

When an optical signal element characterized by minimum optical power (i.e., a "0") is transmitted from the central telecommunication station VSt, this again proceeds via the light waveguide bus OB and the passive optical branchers V to the individual decentralized telecommunication stations TStl .... TStn, and proceeds at each station via its optical directional coupler RK to the reception transducer EW and to the transmission transducer SW. Again, a part of the optical power is unavoidably reflected at the laser diode of the transmission transducer SW. The electrical signal component "0" now appearing at the output of the reception transducer EW also drives the electrical reception signal invertor J, so that a signal component "1" now appears at the output thereof, which in turn proceeds to the input of the transmission transducer SW. This signal component "1" then effects an additional modulation of the laser diode of the transmission transducer SW. This additional modulation is superimposed on (added to) that part of the optical signal component "0" just arriving after traversing the optical delay line VL and reflected by it, thereby causing the transducer SW to deliver an output exactly at a light power that is equal to the light power that was previously delivered upon the arrival of an optical signal component "1". The output is the same independently of whether optical signal components of "0" or "1" were received, because the sum of the light power reflected because of received optical signal elements and potentially additionally transmitted is held at a constant level. The result in the centralized telecommunication station VSt is that the reception light level is likewise independent of the bit pattern of its own transmitted optical signal. Thus a degradation of the reception sensitivity of the optoelectrical electrical transducer EW of the central telecommunication station VSt corresponding to the bit pattern of the transmission optical signal is avoided.

The electrical reception signal invertor J, which as indicated in the drawing, can be formed by an inverting amplifier, can be capacitively connected to a following current source circuit A for additional modulation of the laser diode of the transmission transducer SW, so that a control current i output by the current source circuit A corresponds to the average received optical power. This has the consequence that, given an increase in or reduction of the optical power received in the decentralized station TSt which may occur, for example, due to a long-term drift of the laser diode SW active in the central station TSt or also due to changes in the configuration of the light waveguide telecommunication system which may slightly vary the high ("1") level, the additional modulation of its laser diode is correspondingly increased or reduced. The sum of the light power reflected due to received optical signal elements and potentially additionally transmitted (reflected) is thus kept at a constant level even given varying optical reception power.

Although modifications and changes may be suggested by those skilled in the art, it is the intention of the inventor to embody within the patent warranted hereon all changes and modifications as reasonably and properly come within the scope of his contribution to the art.

I claim as my invention:

1. A passive optical telecommunication system comprising: p1 a central station;
   a plurality of decentralized stations;
   a plurality of waveguide means respectively connected between said central station and said decentralized stations for permitting bi-directional communication between said central station and said decentralized stations;
   central station electro-optical transducer means in said central station for transmitting digital optical signals in common-frequency operation to each of said decentralized stations via said waveguide means;
   decentralized station opto-electrical transducer means in each decentralized station for receiving said digital optical signals from said central station and for transducing said digital optical signals into an electrical signal;
   decentralized station electro-optical transducer means in each decentralized station for transmitting optical signals from that decentralized station to said central station via said waveguide means;
   central station opto-electrical transducer means for receiving said optical signals from each decentralized station;
   inverter means in each decentralized station connected between the opto-electrical transducer means and the electro-optical transducer means in that decentralized station for inverting the electrical signal from said optoelectrical transducer means to obtain an inverted signal and for supplying said inverted signal to said electro-optical transducer means, said inverter means having an operating time; and
   delay means in each decentralized station connected between the electro-optical transducer means in that decentralized station and said waveguide means for delaying said optical signal transmitted by said electro-optical transducer means by a time corresponding to said operating time.

2. A passive optical telecommunication system as claimed in claim I further comprising:
   in each decentralized station, an optical directional coupler connected between said waveguide means and both of said electro-optical transducer and said opto-electrical transducer in that decentralized station, and wherein said delay means in each decentralized station is connected between said optical directional coupler and said electro-optical transducer.

3. A passive optical telecommunication system as claimed in claim I further comprising:
   in each decentralized station, modulator means connected between said inverter means and said electro-optical transducer means for modulating said inverted signal dependent on fluctuations in an average received optical power at that decentralized station.

4. A passive optical telecommunication system comprising:
   a central station;
   a plurality of decentralized stations;
   a plurality of waveguide means respectively connected between said central station and said decentralized stations for permitting hi-directional communication between said central station and said decentralized stations;
   central station electro-optical transducer means in said central station for transmitting digital optical signals in common-frequency operation to each of said decentralized stations via said waveguide means;
   decentralized station opto-electrical transducer means in each decentralized station for receiving said digital optical signals from said central station and for transducing said digital optical signals into an electrical signal, said digital optical signal received by said decentralized station opto-electrical transducer means and being partially reflected by said electro-optical transducer means of said decentralized station and producing a reflected optical signal; said decentralized station electro-optical transducer means in each decentralized station transmitting optical signals from that decentralized station to said central station via said waveguide means;
   central station opto-electrical transducer means for receiving said optical signals from each decentralized station; and
   means in each decentralized station for maintaining a sum of inverted components of said digital optical signal received at that decentralized station and said reflected optical signal at that decentralized station at a constant.

* * * * *